US012729835B2

(12) United States Patent
Zhang et al.

(10) Patent No.: US 12,729,835 B2
(45) Date of Patent: Sep. 8, 2026

(54) LIGHTING APPARATUS AND LIGHTING SYSTEM

(71) Applicant: APUTURE IMAGING INDUSTRIES CO., LTD., Shenzhen (CN)

(72) Inventors: Weisong Zhang, Shenzhen (CN); Daoyou Peng, Shenzhen (CN); Huaiyou Mo, Shenzhen (CN); Xiongxiong Zheng, Shenzhen (CN)

(73) Assignee: APUTURE IMAGING INDUSTRIES CO., LTD., Shenzhen (CN)

( * ) Notice: Subject to any disclaimer, the term of this patent is extended or adjusted under 35 U.S.C. 154(b) by 48 days.

(21) Appl. No.: 18/523,922

(22) Filed: Nov. 30, 2023

(65) Prior Publication Data

US 2024/0183516 A1 Jun. 6, 2024

(30) Foreign Application Priority Data

Dec. 2, 2022 (CN) ......................... 202223234568.9

(51) Int. Cl.
*F21V 15/015* (2006.01)
*F21V 3/00* (2015.01)

(52) U.S. Cl.
CPC .............. *F21V 15/015* (2013.01); *F21V 3/00* (2013.01)

(58) Field of Classification Search
CPC ...... F21V 15/015; F21S 4/28; F21Y 2103/10; F21Y 2115/10
See application file for complete search history.

(56) References Cited

U.S. PATENT DOCUMENTS

| | | | | | |
|---|---|---|---|---|---|
| 5,702,176 | A * | 12/1997 | Engle | F21V 15/015 362/225 |
| 10,215,349 | B1 * | 2/2019 | Robota | F21V 21/02 |
| 2008/0068839 | A1 * | 3/2008 | Matheson | F21V 21/30 362/249.07 |
| 2011/0297971 | A1 * | 12/2011 | Shimizu | F21S 4/28 257/E33.06 |
| 2018/0224079 | A1 * | 8/2018 | Huang | F21V 3/02 |
| 2021/0381665 | A1 * | 12/2021 | Michaud | E04B 9/068 |

(Continued)

FOREIGN PATENT DOCUMENTS

| | | | | | |
|---|---|---|---|---|---|
| CN | 105371148 | A * | 3/2016 | F21V 17/12 |
| CN | 216643950 | U * | 5/2022 | H05B 45/30 |
| DE | 202013100267 | U1 * | 1/2013 | F21K 9/66 |

(Continued)

*Primary Examiner* — Fatima N Farokhrooz

(57) ABSTRACT

Disclosed in the present application is a lighting apparatus and a lighting system, including: a housing; a light source module, provided in the housing; a diffusion shield, connected to the housing and spaced apart from the light source module; and an end cover, provided on two ends of the housing and connected to the diffusion shield, in which the diffusion shield comprises a first diffusion wall and a second diffusion wall positioned on two sides of the first diffusion wall, in which the second diffusion wall further includes a light shading area and a light transmitting area both in a light emitting direction X, the light transmitting area connected to the first diffusion wall, the light shading area positioned on a side of the light transmitting area distal to the first diffusion wall, light of the light source module emitting from the first diffusion wall and the light transmitting area.

6 Claims, 7 Drawing Sheets

(56) References Cited

U.S. PATENT DOCUMENTS

2022/0120421 A1 * 4/2022 Deng ................. H01R 13/6205

FOREIGN PATENT DOCUMENTS

| | | | | | |
|---|---|---|---|---|---|
| DE | 102012202148 | A1 | * | 8/2013 | ............ F21V 21/005 |
| JP | 2000098384 | A | * | 4/2000 | |
| JP | 5547329 | B1 | * | 7/2014 | |
| JP | 2016131102 | A | * | 7/2016 | |
| JP | 2020004690 | A | * | 1/2020 | |

* cited by examiner

LIGHTING APPARATUS AND LIGHTING SYSTEM

CROSS REFERENCE TO RELATED APPLICATIONS

The present application claims the benefit of Chinese Patent Application No. 202223234568.9 filed on Dec. 2, 2022, the contents of which are incorporated herein by reference in their entirety.

FIELD OF THE INVENTION

The present application relates to the field of lighting apparatus, in particular to a lighting apparatus and a lighting system.

BACKGROUND OF THE INVENTION

In the creation process of film and television dramas, commercials, and videos, lamps are often required for illuminating. Based on the use of different scenes, the brightness requirements of the lamps vary. However, large photography lights are large and bulky, and the brightness of a single photography light is not able to meet the photographic requirements. Therefore, it is feasible to get a brighter and wider range of light sources by splicing a plurality of lamps together.

After splicing lamps of prior art, due to a previous design of a single lamp only meets the use scenario of a single lamp, such as pointing in a specific direction or light emitting effect, when at least two lamps are spliced together, the two adjacent lamps either generate an obvious black seam of shading therebetween or generate gradient brightness with different shades, resulting in a poor lighting uniformity after overall splicing, and different splicing methods of different shapes or patterns bring black borders in different directions, uneven light mixing and other impacts of poor performance of overall lighting, which is unable to meet the requirements of the lighting parameters.

SUMMARY OF THE INVENTION

In order to overcome at least one of defects of the prior art mentioned above, provided in the present application is a lighting apparatus, which may solve problems such as black borders and poor uniformity when at least two lighting apparatuses are spliced together.

The technical solution adopted by the present application to solve the problems is to provide a lighting apparatus, including: a housing;

- a light source module, provided in the housing;
- a diffusion shield, connected to the housing and spaced apart from the light source module; and
- an end cover, provided on two ends of the housing and connected to the diffusion shield,
- in which the diffusion shield comprises a first diffusion wall and a second diffusion wall positioned on two sides of the first diffusion wall, in which the second diffusion wall further includes a light shading area and a light transmitting area both in a light emitting direction X, the light transmitting area connected to the first diffusion wall, the light shading area positioned on a side of the light transmitting area distal to the first diffusion wall, light of the light source module emitting from the first diffusion wall and the light transmitting area.

The diffusion shield is provided with a light shading area and a light transmitting area, in which the light shading area is not transmitting the light, which meets the light direction and illumination level of a single lamp when used independently, while the light may be partially emitted from a side of the diffusion shield through the light transmitting area but not allowing the entire side to be completely emitted, which may reduce excessive diffusion of light from the lighting apparatus and may reduce the impact of the black borders after splicing by partially and laterally emitting the light through the light transmitting area after splicing the two lamps.

The light shading area and the light transmitting area are parallel to an extending direction of the light source module; the light shading area is configured to allow reflection of light from the light source module, and along the light emitting direction X, a height h1 of the light shading area is greater than a height h2 of the light transmitting area, in which the height of the light shading area satisfies that $H\times\frac{1}{2}\leq h1\leq H\times\frac{3}{4}$, H indicating a height of the second diffusion wall; and the first diffusion wall and the second diffusion wall are formed integrally.

The end cover is provided perpendicular to the diffusion shield substantially; along a height direction of the second diffusion shield, the end cover includes an end-cover light transmitting area; the end-cover light transmitting area includes a light emitting area out of a plane Y on which the light source module is positioned; and the end-cover light transmitting area is used to diffuse the light emitted from the light source module.

The lighting apparatus further includes a splicing holder; the splicing holder is provided on two ends of the housing, provided with stepped height difference, used to connect with a splicing piece; the end cover is connected to the splicing holder; and the end cover abuts the diffusion shield to form an enclosed space with the diffusion shield and the housing to accommodate the light source module.

The splicing holder includes a connecting surface connected to the housing and a splicing surface, in which the splicing surface is connected to the end cover and a surface of the splicing surface is aligned with a lateral surface of the end cover; the connecting surface is positioned on a side of the splicing surface distal to the end cover; there is height difference between the connecting surface and the splicing surface; and the connecting surface is used for splicing with the splicing piece.

The lighting apparatus further includes a circuit board, in which the circuit board is positioned in the housing and electrically connected to the light source module; the splicing surface comprises an electrical terminal A and a mechanical terminal, in which a number of the mechanical terminals is greater than that of the electrical terminals A; and the mechanical terminals are spaced apart around the electrical terminal A, the mechanical terminal used for mechanically connecting to a terminal of the splicing piece to allow fixing the splicing piece to the lighting apparatus, an end of the electrical terminal A electrically connected to the circuit board, an opposite end of the electrical terminal A relatively exposed for connecting with electrical terminal B on the splicing piece to electrically connect two adjacent lighting apparatuses.

A side of the housing opposite to the diffusion shield is provided with a sliding groove, the sliding groove extending in a first direction; a top surface of the sliding groove is higher than the connecting surface; and the sliding groove is used for snap-fitting with an external supporting plate.

The lighting apparatus also includes two first magnetic bodies; each first magnetic body is fixed on the connecting surface adjacent to the splicing surface; and the first magnetic body is parallel to the light source module.

A side of the connecting surface facing the splicing surface is further provided with a guiding block; the guiding block extends along a direction of the height difference between the connecting surface and the splicing surface; and the guiding block is used for snap-fitting with a groove of the splicing piece.

The housing includes a first lateral plate, a bottom plate, a second lateral plate and a top plate sequentially enclosed; the first lateral plate and the second lateral plate are parallel, and each of the first lateral plate and the second lateral plate is provided with a mounting groove; the connecting surface and the splicing surface are connected to the first lateral plate and the second lateral plate; a height difference of the first lateral plate and the second lateral plate corresponding to positions of the connecting surface and the splicing surface is identical to that between the connecting surface and the splicing surface; the bottom plate is parallel to the top plate; end surfaces of the first lateral plate, the second lateral plate, the diffusion shield and the connecting surface abut the end cover; the light source module is provided on a side of the bottom plate opposite to the top plate; the circuit board is provided between the bottom plate and the top plate; any one of the first lateral plate and the second lateral plate is provided with an electrical socket; the electrical socket is electrically connected to the circuit board; a side of the top plate opposite to the bottom plate is provided with cooling fins extending along an arrangement direction of the light source module; and the cooling fins are lower than a top surface of the sliding groove.

A side of the light shading area distal to the light transmitting area is provided with a mounting track; a bottom of the housing is provided with a mounting groove; and the mounting track is snap-fitted with the mounting groove correspondingly, in which the mounting groove comprises a top snap-fit edge, a bottom snap-fit edge, a first side snap-fit edge and a second side snap-fit edge, and the top snap-fit edge, the bottom snap-fit edge, the first side snap-fit edge and the second side snap-fit edge abut an upper side, a lower side, a left side and a right side of the mounting track respectively.

The end cover includes an end cover body and a snap-fit rib, in which the snap-fit rib is protruded from a side of the end cover body facing the diffusion shield and positioned at an edge of the end cover body; a bending direction of the snap-fit rib is provided in correspondence with an outer contour of a cross-section formed by the first diffusion wall and the second diffusion wall, so as to attach to the diffusion shield;

The end-cover light transmitting area is provided on the end cover body corresponding to an area enclosed by the first diffusion wall and the second diffusion wall, the end cover being made up of light-transmitting material;

A side of the end cover body opposite to the splicing holder is further provided with a mechanical insertion hole and a fixing hole, wherein the mechanical insertion hole is positioned between two adjacent fixing holes and used for connecting with a fixing bracket externally; and the fixing hole is connected to the housing to fix the end cover.

The end cover further comprises an end-cover light shading area, wherein the end-cover light transmitting area is aligned with the light transmitting area and the end-cover light shading area is aligned with the light shading area.

There are four mechanical terminals and one electrical terminal A, wherein the four mechanical terminals are provided equally spaced apart around the electrical terminal A as a center, and the guiding block as well as two of the mechanical terminals are provided coaxially.

The lighting apparatus further comprises a second magnetic body, wherein the second magnetic body comprises a magnetic main body and snap-fit edges positioned on two sides of the magnetic main body; the snap-fit edge is used for detachably snap-fitting with the sliding groove; and a side of the magnetic main body is correspondingly connected to the first magnetic body, while an opposite side of the magnetic main body is used for magnetic fixation with an external structure.

Provided in the present application is also a lighting system, including a splicing piece and at least two lighting apparatuses mentioned above, and diffusion shields as well as end covers of two adjacent lighting apparatuses are aligned with each other.

Other related technical effects of the lighting apparatus and lighting system provided by the present application are illustrated in the embodiments.

DETAILED DESCRIPTION OF THE PREFERRED EMBODIMENTS

Figure 1:
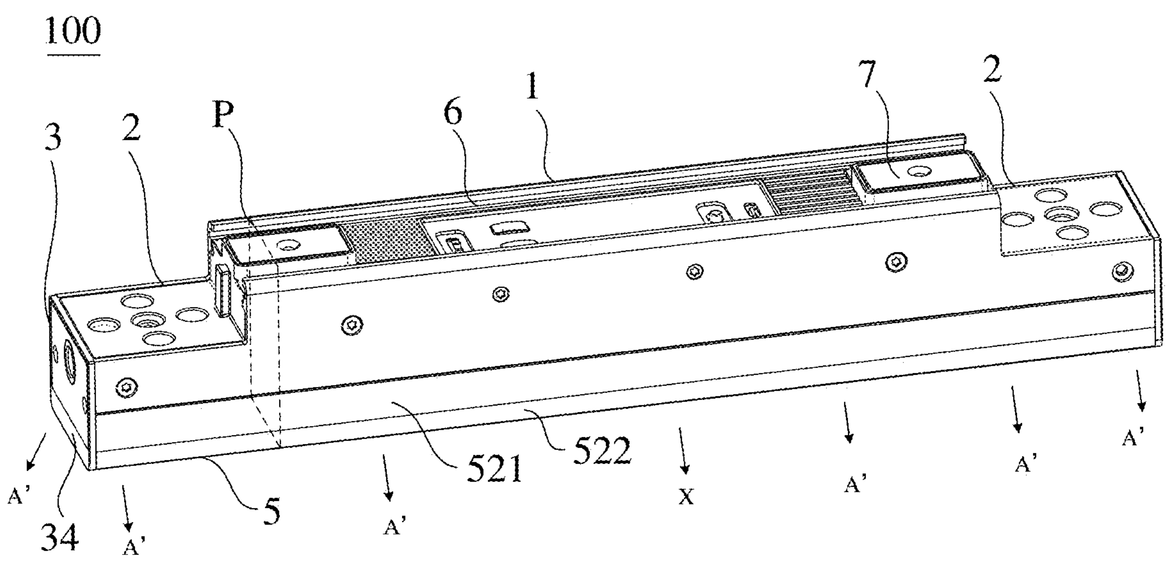
FIG. 1 is a structural diagram of the lighting apparatus provided in an embodiment of the present application.

For a better understanding and implementation, the technical solutions in the embodiments of the present application are clearly and completely described and discussed below in conjunction with the attached drawings of the present application. Obviously, the embodiments described herein are only some of the embodiments of the present application but not all of them. Based on the embodiments in the present application, all other embodiments acquired by those skilled in the art without inventive effort fall within the scope of protection of the present application.

In order to facilitate the understanding of the embodiments of the present application, specific embodiments in conjunction with the attached drawings are further explained hereinafter, and each embodiment does not constitute a limitation to the embodiments of the present application.

In the description of the present application, it is to be noted that the terms "up", "down", "front", "back", "left", "right", "vertical", "horizontal", "top", "bottom", "inside", "outside" and other orientation or position relationships are based on the orientation or position relationships shown in the attached drawings. It is only intended to facilitate description of the present application and simplify description, but not to indicate or imply that the referred device or element has a specific orientation, or is constructed and operated in a specific orientation. Therefore, they should not be construed as a limitation of the present application.

Unless otherwise defined, all terms including technical and scientific terms used herein have the same meaning as commonly understood by those skilled in the art to which the present application belongs. The terms used herein in the specification of the present application are used only to describe specific embodiments and are not intended as a limitation of the application.

Please refer to FIGS. 1-7 for embodiment 1 of the present application. Disclosed is a lighting apparatus 100, including a housing 1, a light source module 4, a diffusion shield 5 and an end cover 3, in which the housing 1 may be made of such as metal or alloy, and the diffusion shield 5 and the end cover 3 may be made of such as plastic or polycarbonate. The light source module 4 is provided in the housing 1. The light source module 4 may also include a rigid or flexible substrate 411 and a light source 412 provided on the substrate 411, in which the light source may include such as LED (light emitting diode) strips or arrays, and others such as quantum dot light emitting diodes or organic light emitting diodes are also feasible. There may be a plurality of light sources 412 arranged in an array. Admittedly, the light source module 4 may be a plurality of light strips and the like. The light sources may be white, colored, and combinations thereof and the like. The final overall shape of the light source module 4 may be such as rectangular, square, polygonal, or circular, which may be designed as required.

The diffusion shield 5 is connected to the housing 1 and spaced apart from the light source module 4, in which the diffusion shield 5 may be strip-shaped, panel-shaped, circular, curved arc-shaped or other shapes designed according to the requirements of the scenario, as long as it satisfies that the diffusion shield 5 is able to cover the arrangement of the light source module 4. The end cover 3 is provided on two ends of the housing 1 and connected to the diffusion shield 5. The end cover 3 may be a shape that fits with the end of the diffusion shield 5. For example, the diffusion shield 5 may be strip-shaped. If the cross-section of the diffusion shield 5 is rectangular, the end cover 3 may be rectangular, and if the cross-section of the diffusion shield 5 is fan-shaped, the end cover may be fan-shaped, as long as they fit together to form a sealing space.

The diffusion shield 5 includes a first diffusion wall 51 and a second diffusion wall 52 positioned on both sides of the first diffusion wall 51, in which the first diffusion wall 51 and the second diffusion wall 52 may allow or partially allow passing of light. The first diffusion wall 51 and the second diffusion wall 52 may be planar or convex (viewed in cross-section, such as the plane where the optical axis is positioned). The second diffusion wall 52 may be provided at an angle to the first diffusion wall 51, such as perpendicular to each other or at an angle of 80° or other designed angles as required. For example, both of them are planar; admittedly, both of them may be provided with appropriate connecting chamfers or transition shapes at their connections. Alternatively, the first diffusion wall 51 may be convex in cross-section and the second diffusion wall 52 may be straight, and the outer contour of the cross-section for both may be such as rectangular with or without chamfers or fan-shaped. The second diffusion wall 52 further includes a light shading area 521 and a light transmitting area 522 both in a light emitting direction X. It is to be understood that the light emitting direction of a plane Y where the vertical light source module 4 is positioned is defined as the optical axis X. When the plurality of light source modules 4 are not positioned in a plane, the tangent line thereof is defined as the plane Y where they are positioned. The light shading area 521 is configured to allow reflection of light from the light source module 4. The light shading area 521 of the present application may be understood as the light shading area 521 being less capable of transmitting light than the light transmitting area 522. In some optional implementations, the light shading area 521 may also be made, for example, in a milky white color, which is strictly speaking still slightly light transmissive, yet such light transmittance is not as powerful as that of the light transmitting area 522, and it is negligible in the light impact thereof on the light transmitting area 522 and the first diffusion wall 51. Admittedly, the light shading area 521 may also be completely opaque in other implementations. The light transmitting area 522 is connected to the first diffusion wall 51. The light shading area 521 is positioned at a side of the light transmitting area 522 distal to the first diffusion wall 51. The light from the light source module 4 is emitted through the first diffusion wall 51 and the light transmitting area 522. The light transmitting area 522 and the first diffusion wall 51 may allow light from the light source module 4 to emit a different kind of light, such as light that may be directly emitted from the light source module 4 or light that may be emitted from a plurality of light source modules 4 after mixing. It is to be understood that, referring to FIG. 1 to FIG. 4, the light emitted directly by the light source module 4 may be A; the light passing through the light transmitting area 522 and the first diffusion wall 51 is A'; the light from the light source module 4 may pass directly through the light transmitting area 522 and the first diffusion wall 51; and admittedly, some of the light may be reflected internally in the light shading area 521 and then emitted. The light shading area 521 has the property of reflecting light from the light source module 4, so that the light shading area 521, for example, may be coated with a reflective layer or be made up of a material having a high reflectivity.

Compared to some prior art without the light shading area 521, the entirety of the existing diffusion cover 5 is light transmissive. Then the user may see the light source module 4 (e.g., light source 412 or substrate 411). Due to the large number of light source modules 4, it is prone to bring visual impacts such as black borders. Then, in a luminous state, it is prone to lead to uneven light mixing and it is necessary to compensate for the impact of the position. In addition, the user is less inclined to, for example, the internal light source being directly observed. By adopting the light shading area 521 of the present application, the light from the light source module 4 is emitted through the first diffusion wall 51 and the light transmitting area 522 instead of through or substantially through the light shading area 521, which effectively improves the uniformity of the light emission of the lighting apparatus in a predetermined direction, reduces the area of light leaking out of the light source module 4 from the lateral edges, effectively reduces the loss brought by too much light leaking out from the lateral edges, and allows the light source module 4 to emit a more uniform light via the diffusion cover 5, with a better luminance and directionality. In addition, when two lighting apparatuses are spliced together, compared to the existing design in which the lateral edges are completely opaque, the light transmitting area 522 and the first diffusion wall 51 of the present application are both light transmissive, which achieves a splicing performance without black borders, and allows the spliced lighting apparatuses to provide excellent continuity of light transmission and uniformity of light mixing.

In some implementations, referring to FIGS. 1-4, the light shading area 521 and the light transmitting area 522 are parallel to an extension direction of the light source module 4 respectively. For example, the substrate 411 may extend in a length direction and be provided with light sources 412 arrayed in a length direction. Then, the light shading area 521 and the light transmitting area 522 also extend in the same axis thereof, i.e., the light shading area 521 and the light transmitting area 522 both correspondingly parallel to the light source module 4. Admittedly, the light source module 4 may extend both in length or width or in other directions, and the light shading area 521 and the light transmitting area 522 may still be parallel to the light source module 4. The light shading area 521 is configured to allow reflection of light from the light source module 4. For example, the light shading area 521 may be provided with a reflective layer internally, or the light shading area 521 itself is made of a highly reflective material as long as the light shading area 521 is capable of reflecting light. The embodiment of the present application merely exemplifies that the light emitting direction X is perpendicular to a length direction of the light source module 4. Along the light emitting direction X, a height h1 of the light shading area 521 is larger than a height h2 of the light transmitting area 522, i.e., the light transmitting area 522 being not larger than the light shading area 521, which ensures that there is no excessive loss of light source module 4 and no black borders after splicing, in which the height h1 of the light transmitting area satisfies $H\times\frac{1}{2}\leq h1\leq H\times\frac{3}{4}$, H indicating a height of the second diffusion wall 52. It is to be understood that if the light shading area 521 and the light transmitting area 522 are curved or diagonal in cross-section, then the length relationship between H, h1, and h2 may be referenced by a distance from a vertical line relative to the direction of the optical axis. The first diffusion wall 51 and the second diffusion wall 52 are formed integrally. Admittedly, the components mentioned above may also be separate part and then be connected (including, but not limited to, such as snap-fit or adhesive) to form a complete unit.

Figure 4:
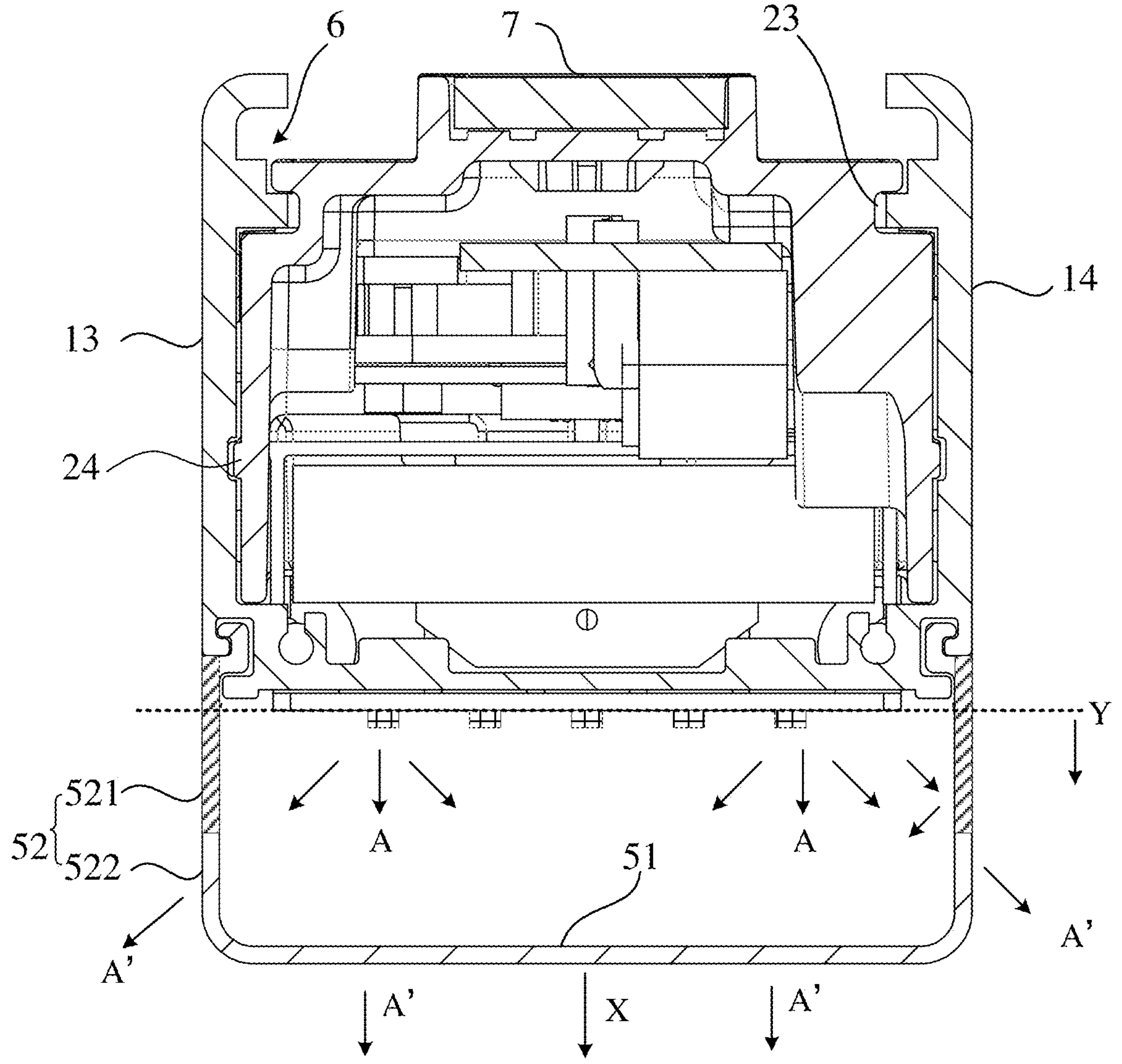
FIG. 4 is a light emitting diagram of a cross-sectional structure of the lighting apparatus provided in an embodiment of the present application.
Figure 5:
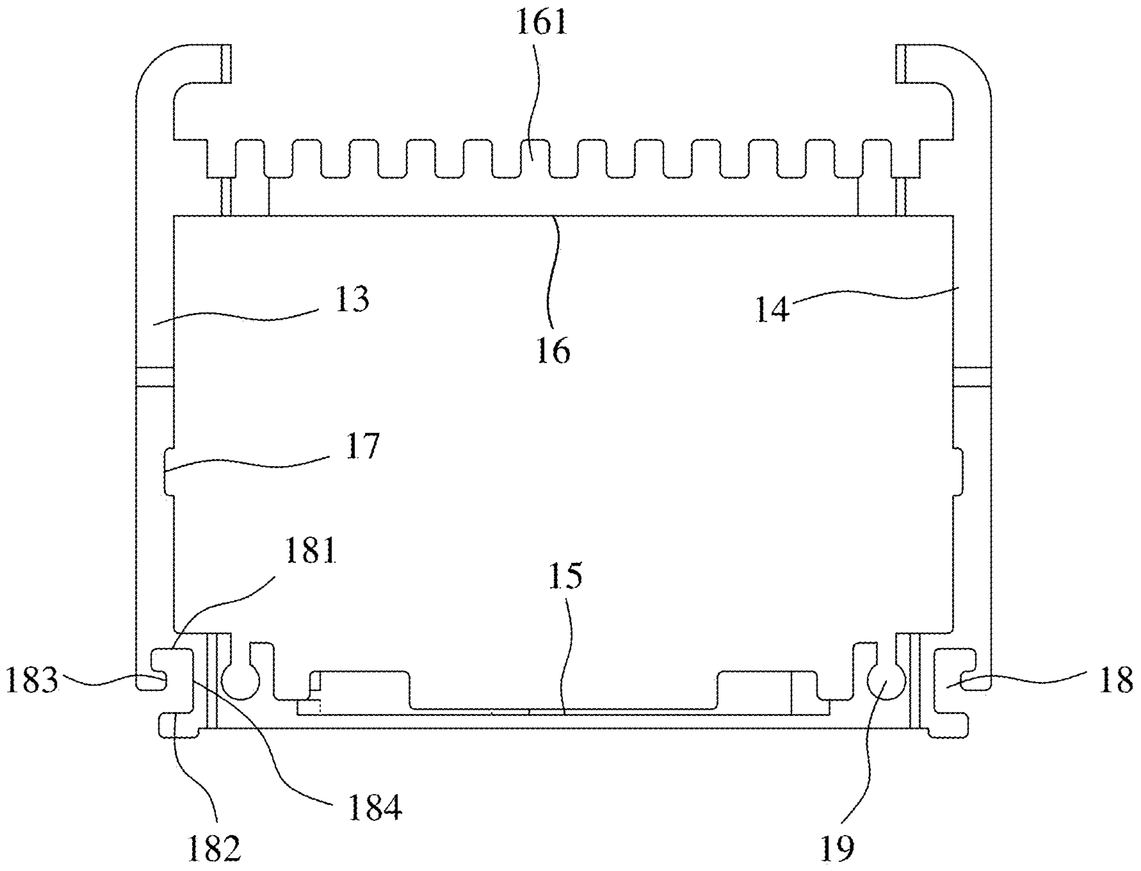
FIG. 5 is a structural diagram of the housing provided in an embodiment of the present application.
Figure 6:
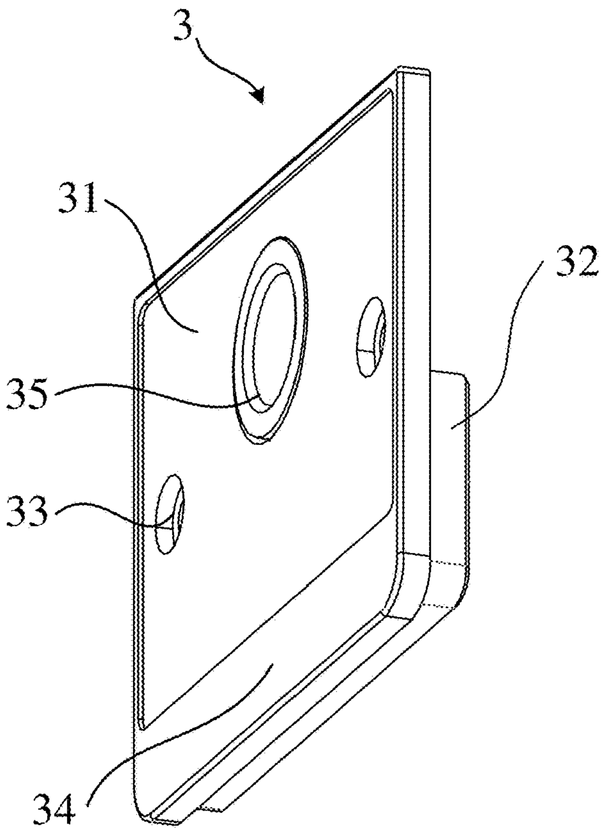
FIG. 6 is a structural diagram of the end cover provided in an embodiment of the present application.

In some implementations, the end cover 3 is provided substantially perpendicular to the diffusion shield 5. For example, they are perpendicular to each other or substantially perpendicular, i.e., deviations with a small angle of 5-10° may still be understood herein as substantially perpendicular. Along a height direction of the second diffusion wall 52, the end cover 3 includes an end-cover light transmitting area 34. As shown in FIG. 4, the end-cover light transmitting area 34 includes a light emitting area out of a plane Y on which the light source module 4 is positioned; and the end-cover light transmitting area 34 is used to diffuse the light emitted from the light source module 4. It is to be understood that, when viewed from a side of the lighting apparatus, as long as the overall area of the end-cover light transmitting area 34 is larger than the area of the light emitting area out of the plane where the light source module 4 is positioned, or the outer contour of the end-cover light transmitting area 34 is larger than the area out of the plane Y where the light source module 4 is positioned (i.e., the area under the Y-arrow in FIG. 4), it is sufficient to allow the light from the light source module 4 to be emitted through the end-cover light transmitting area 34, thereby effectively avoiding the case of black borders occurring between two adjacent end covers 3 when splicing, rendering better light emitting uniformity after splicing of the lighting apparatus.

Optionally, the diffusion shield 5 and the end cover 3 may both be made of a white or milky white material, and the corresponding light shading area 521 may be made of a material that is opaque to light by such as coating or attaching. Admittedly, the light shading area 521 and the light transmitting area 522 may also be formed by injection molding with different materials, i.e., the material of the light shading area 521 being opaque, and the material of the light transmitting area 522 being light transmissive. In another implementations, the light transmittance of the light transmitting area 522 and the end-cover light transmitting area 34 may be the same, or of course different. For example, the light transmittance of the light transmitting area 522 may be better than that of the end-cover light transmitting area 34. When an area of the end-cover light transmitting area 34 is smaller than that of the diffusion shield 5, the light transmittance of the end-cover light transmitting area 34 may be better than that of the light transmitting area 522.

In some implementations, the lighting apparatus may be spliced, further including a splicing holder 2. There may be two splicing holders 2 and both are provided on two ends of the housing 1; the splicing holder 2 may be made of such as metal or alloy and be provided with stepped height difference; and the splicing holder 2 is used to connect with a splicing piece. The end cover is connected to the splicing holder. The end cover abuts the diffusion shield to form an enclosed space with the diffusion shield and the housing to accommodate the light source module. It is to be understood that, the end cover 3 is fixed to the housing 1 by the splicing holder 2. The stepped height difference in design may allow, after splicing the lighting apparatuses with the splicing pieces, aligning all the diffusion shields 5 and end covers 3 of the lighting apparatuses to be positioned in the same plane, forming a lighting effect similar to a large flat panel.

In some implementations, referring to FIGS. 1-7, the splicing holder 2 includes a connecting surface 21 connected to the housing 1 and a splicing surface 22, in which the splicing surface 22 is connected to the end cover 3 and a surface of the splicing surface 22 is aligned with a lateral surface of the end cover 3; the connecting surface 21 is positioned on a side of the splicing surface 22 distal to the end cover 3; there is height difference between the connecting surface 21 and the splicing surface 22; and the connecting surface 21 is used for splicing with the splicing piece. The lighting apparatus also includes a circuit board 41. The circuit board 41 is positioned in the housing 1 and is electrically connected to the light source module 4. There may be one or more of the circuit boards 41. The electrical connection herein may be understood that it is sufficient to be able to be electrically connected, which includes a direct electrical connection or an indirect electrical connection. The splicing surface 22 includes an electrical terminal A 221 and a mechanical terminal 222, in which a number of the mechanical terminals 222 is greater than that of the electrical terminals A 221. For example, there may be one or two electrical terminals A 221, while there may be three or four mechanical terminals 222. The mechanical terminals 222 are spaced apart around the electrical terminal A 221, the mechanical terminal 222 used for mechanically connecting to a terminal of the splicing piece to allow fixing the splicing piece to the lighting apparatus, an end of the electrical terminal A 221 electrically connected to the circuit board 41, an opposite end of the electrical terminal A 221 relatively exposed for connecting with electrical terminal B on the splicing piece to electrically connect two adjacent lighting apparatuses. It is to be under stood that the splicing piece may be provided with wires or printed circuit boards so that the lighting apparatuses may be electrically connected when two or even more lighting apparatuses are connected by the splicing pieces. For example, all the spliced lighting apparatuses may be synchronously controlled by controlling only one of the lighting apparatuses.

In some implementations, a side of the housing 1 opposite to the diffusion shield 5 is provided with a sliding groove 6, the sliding groove 6 extending in a first direction; a top surface of the sliding groove 6 is higher than the connecting surface 21, in which the sliding groove 6 may extend in a length direction of the housing 1. The sliding groove 6 allows such as bracket or other components to insert so as to support and fix the lighting apparatus. The lighting apparatus may further include a display 42 and buttons 43 both provided on the housing 1 and partially exposed with respect to a surface of the housing 1 to facilitate viewing and operation by a user. A height of a bottom surface of the sliding groove 6 is higher than that of a portion of both a display 42 and buttons 43 exposed with respect to the housing 1, so that the bracket and other fixing members do not press on such as the display 42 or buttons 43 in this case, so as to protect the display 42 or buttons 43.

Figure 7:
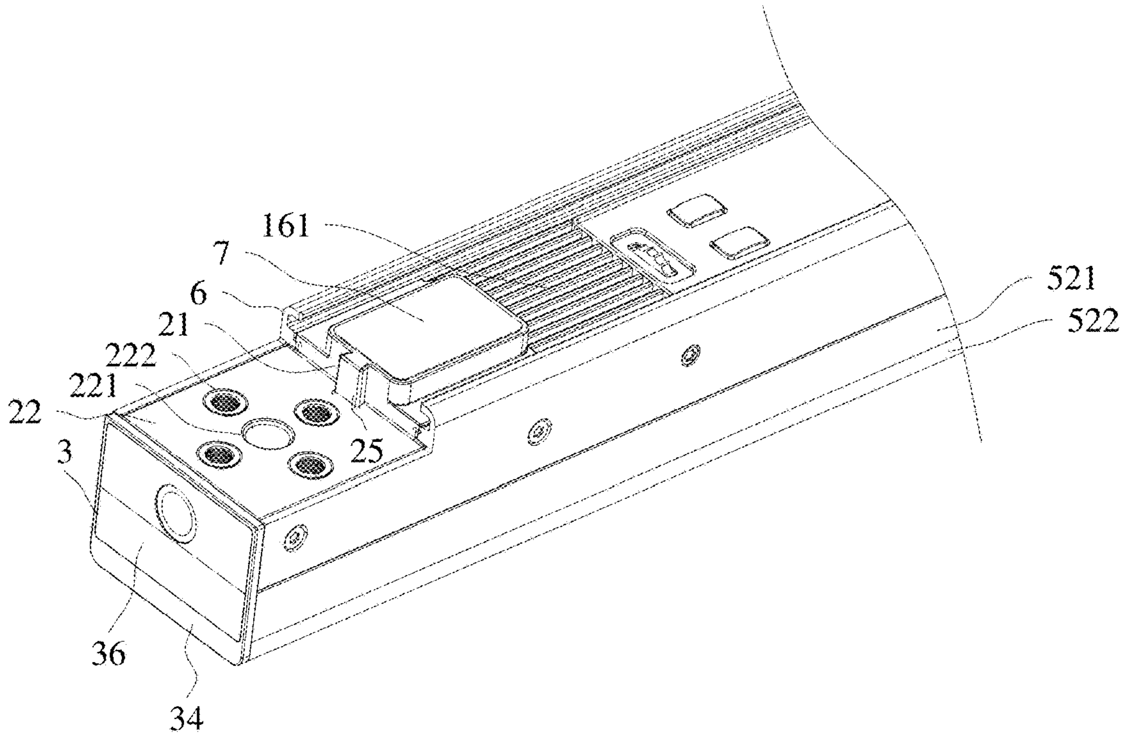
FIG. 7 is a structural diagram of a part of the lighting apparatus provided in another embodiment of the present application.

Referring to FIG. 7, the lighting apparatus may further include two first magnetic bodies 7. Each first magnetic body 7 is fixed to the connecting surface 21 proximal to the splicing surface 22. For example, the first magnetic body 7 may be fixed to the connecting surface 21 by such as screws or adhesive. The first magnetic body 7 is parallel to the light source module 4. A side of the first magnetic body 7 is used for fixing an external structure, in which the external structure may be such as plates or brackets made of metal or magnetic materials. The above method allows the entire lighting apparatus to be attracted and fixed to other platforms, and ensures that the light emitting direction of the light source module 4 is not affected. A top surface of the sliding groove 6 may be higher than the connecting surface 21, and the top surface of the sliding groove 6 may be aligned or substantially aligned with the first magnetic body 7, thereby effectively reducing the risk of the outer surface of the first magnetic body 7 being exposed to damage by friction.

In some implementations, a side of the connecting surface 21 facing the splicing surface 22 is further provided with a guiding block 25; the guiding block 25 extends along a direction of the height difference between the connecting surface 21 and the splicing surface 22; and the guiding block 25 is used for snap-fitting with a groove 93 of the splicing piece. For example, the guiding block 25 may be such as rectangular. The guiding block 25 may play a pre-positioning role, reducing the risk of incorrect assembly with the splicing piece. It is to be understood that the guiding block 25 may also be replaced with a corresponding guiding groove, the vice versa.

In some implementations, the housing 1 includes a first lateral plate 13, a bottom plate 15, a second lateral plate 14 and a top plate 16 sequentially enclosed. The first lateral plate 13 and the second lateral plate 14 are parallel, and each of the first lateral plate 13 and the second lateral plate 14 is provided with a mounting groove 18. The connecting surface 21 and the splicing surface 22 are connected to the first lateral plate 13 and the second lateral plate 14. It is to be understood that interior sides of the first lateral plate 13 and the second lateral plate 14 may be provided with a positioning protrusion 131 or a recess 17, while the connecting surface 21 and the splicing surface 22 are correspondingly provided with a notch 23 or a protrusion 24, in which they are snap-fitted, so that accurate positioning of the connecting surface 21 and the splicing surface 22 may be achieved when fixing them, ensuring that both the connecting surface 21 and the splicing surface 22 of the splicing holder at two ends are accurately aligned. A height difference of the first lateral plate 13 and the second lateral plate 14 corresponding to positions of the connecting surface 21 and the splicing surface 22 is identical to that between the connecting surface 21 and the splicing surface 22. The bottom plate 15 is parallel to the top plate 16. End surfaces of the first lateral plate 13, the second lateral plate 14, the diffusion shield 5 and the connecting surface 21 abut the end cover 3. The light source module 4 is provided on a side of the bottom plate 15 opposite to the top plate 16, so that the light source module 4 may be mounted in parallel to ensure the light emitting direction after cooperating with the diffusion shield 5. The circuit board 41 is provided between the bottom plate 15 and the top plate 16. For example, the circuit board 41 may be fixed on such as the bottom plate 15, the top plate 16, the first lateral plate 13 or the second lateral plate 14. Any one of the first lateral plate 13 and the second lateral plate 14 is provided with an electrical socket 132, in which the electrical socket 132 is provided on a lateral side, so that power may still be supplied to the lighting apparatus during normal use. For example, the position of the lateral plate may not be obscured so that the wiring may be connected externally normally when the top plate 16 is placed on a platform working to illuminate. The electrical socket 132 is electrically connected to the circuit board 41. The electrical socket 132 may be relatively exposed to power the circuit board 41 or the light source module 4 from an external power supply, and admittedly, the electrical socket 132 may achieve charging of the built-in batteries and so on. A side of the top plate 16 opposite to the bottom plate 15 is provided with cooling fins 161 extending along the light source module 4. The cooling fins may extend along an arrangement direction of the light source module 4, thereby facilitating heat dissipation from the lighting apparatus.

Optionally, the top plate 16 is also provided with an avoidance opening. The display, buttons or other components are positioned on the avoidance opening. A height of the display 42 and the buttons 43 is lower than the cooling fins 161, while the cooling fins 161 are lower than a top surface of the sliding groove 6, thereby allowing an external supporting plate (not shown in figures) to be slid within the sliding groove 6 for securing the assembly in a user's preferred position. Furthermore, the external component slides into the sliding groove 6 without causing damage to the display 42 and the buttons 43.

In some implementations, a side of the light shading area 521 distal to the light transmitting area 522 is provided with a mounting track 523; a bottom of the housing 1 is provided with a mounting groove 18; and the mounting track 523 is snap-fitted with the mounting groove 18 correspondingly, in which the mounting groove 18 includes a top snap-fit edge 181, a bottom snap-fit edge 182, a first side snap-fit edge 183 and a second side snap-fit edge 184, and the top snap-fit edge 181, the bottom snap-fit edge 182, the first side snap-fit edge 183 and the second side snap-fit edge 184 abut an upper side, a lower side, a left side and a right side of the mounting track 523 respectively.

In some implementations, the end cover 3 includes an end cover body 31 and a snap-fit rib 32, in which the snap-fit rib 32 is protruded from a side of the end cover body 31 facing the diffusion shield 5 and positioned at an edge of the end cover body 31. A bending direction of the snap-fit rib 32 is provided in correspondence with an outer contour of a cross-section formed by the first diffusion wall 51 and the second diffusion wall 52, so as to attach to the diffusion shield 5. For example, if the outer contours of both the first diffusion wall 51 and the second diffusion wall 52 are rectangular, the snap-fit rib 32 is also rectangular, and if the outer contours of both the first diffusion wall 51 and the second diffusion wall 52 are fan-shaped, the snap-fit rib 32 is also fan-shaped. The engagement between the snap-fit rib 32 and both the first diffusion wall 51 and the second diffusion wall 52 achieves the support of the diffusion shield 5. The outer surface of the end cover 3 opposite to the first diffusion wall 51 and the second diffusion wall 52 may still be planar. The overall outer contour of the end cover 3 is aligned with that of the diffusion shield 5, with no additional structure protruding out to ensure that the lighting apparatuses are formed a seamless splicing.

The end-cover light transmitting area 34 is provided on the end cover body 31 corresponding to an area enclosed by the first diffusion wall 51 and the second diffusion wall 52, the end cover 3 being made up of light-transmitting material. It is to be understood that the end cover 3 is made of a light-transmissive material in the area of vertical projection of the first diffusion wall 51 and the second diffusion wall 52, thereby allowing no dim areas to be formed in this area. Since the area excluded the end-cover light transmitting area 34 of the end cover 3 is covered by the connecting surface 21 and the light from the light source module 4 fails to reach the bottom, the entire end cover 3 is made of a consistent material which facilitates the processing and assembly, and reduces the production and manufacturing costs.

A side of the end cover body 31 opposite to the splicing holder 2 is further provided with a mechanical insertion hole 35 and a fixing hole 33, in which the mechanical insertion hole 35 is positioned between two adjacent fixing holes 33 and used for connecting with a fixing bracket externally. The fixing bracket may be a supporting column with different diameters or the like. The mechanical insertion hole 35 may be such as a quarter or three-eighths screw hole. The fixing holes 33 and the housing 1 are connected to fix the end cover 3. The mechanical insertion holes 35 are positioned between two adjacent fixing holes 33 to ensure the fixing center of gravity is stabilized.

In some implementations, referring to FIG. 7, the end cover 3 further includes a end-cover light shading area 36. The end-cover light transmitting area 34 is aligned with the light transmitting area 522. The end-cover light shading area 36 is aligned with the light shading area 521. That is, the light emitting design of the end cover may be consistent with the light emitting design of the second diffusion wall 52, so that the lateral light emitting consistency is better in the entire periphery, leading to better uniformity of light emitting from the spliced lighting system.

In some implementations, there are four mechanical terminals 222 and one electrical terminal A 221, in which the four mechanical terminals 222 are provided equally spaced apart around the electrical terminal A 221 as a center. Due to such symmetrical design, it allows the splicing pieces to be spliced in any direction instead of having to be spliced at a specific angle, improving compatibility with the splicing pieces and splicing efficiency. The guiding block 25 as well as two of the mechanical terminals 222 are provided coaxially, so that it improves the consistency of the splicing structure of each lighting apparatus, reduces the design complexity of the lighting apparatus, and achieves the uniformity of the splicing standard of such lighting apparatus.

Figure 8:
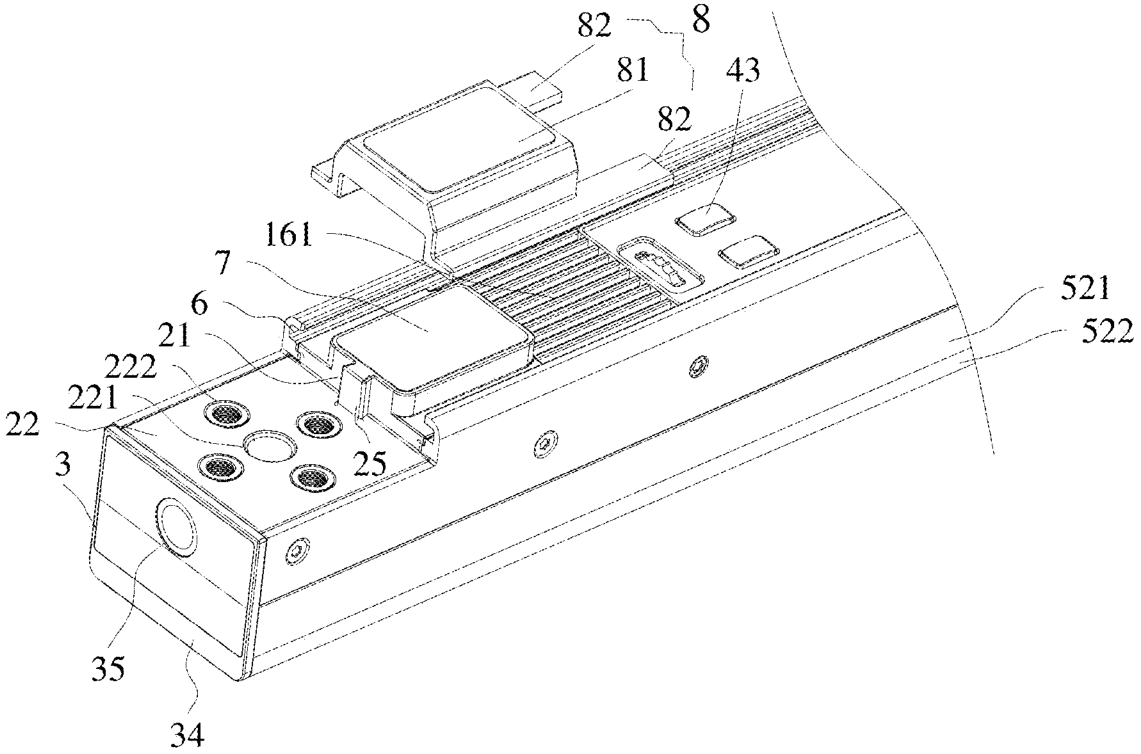
FIG. 8 is a structural diagram of a part of the lighting apparatus provided in a further embodiment of the present application.

In some implementations, referring to FIG. 8, the lighting apparatus further includes a second magnetic body 8, in which the second magnetic body 8 includes a magnetic main body 81 and snap-fit edges 82 positioned on two sides of the magnetic main body 81; the snap-fit edge 82 is used for detachably snap-fitting with the sliding groove 6; and a side of the magnetic main body 81 is correspondingly connected to the first magnetic body 7, while an opposite side of the magnetic main body 81 is used for magnetic fixation with an external structure. The second magnetic body 8 is cooperated and attracted with the first magnetic body 7 detachably, so that the overall height of the housing 1 may be raised, ensuring that each side of a plurality of lighting apparatuses of different models is still aligned or substantially aligned with each other when they are spliced together.

It is to be understood that the lighting apparatus of the present application may also include associated components such as reinforcing ribs, display 42, buttons 43, batteries, snap-fit slots or screws. For example, the display 42, the buttons 43 and the light source module 4 are electrically connected to the circuit board 41. The power input terminal may be connected to an external power supply to achieve power supply or charging. The display 42 may display relevant information such as power volume, brightness, color temperature, or color of the lighting apparatus. The button 43 may achieve the function of switching on and off or adjusting the optical parameters. All of the above are necessary components for achieving the basic work or function of the lighting apparatus, and the details are not further elaborated herein.

Figure 2:
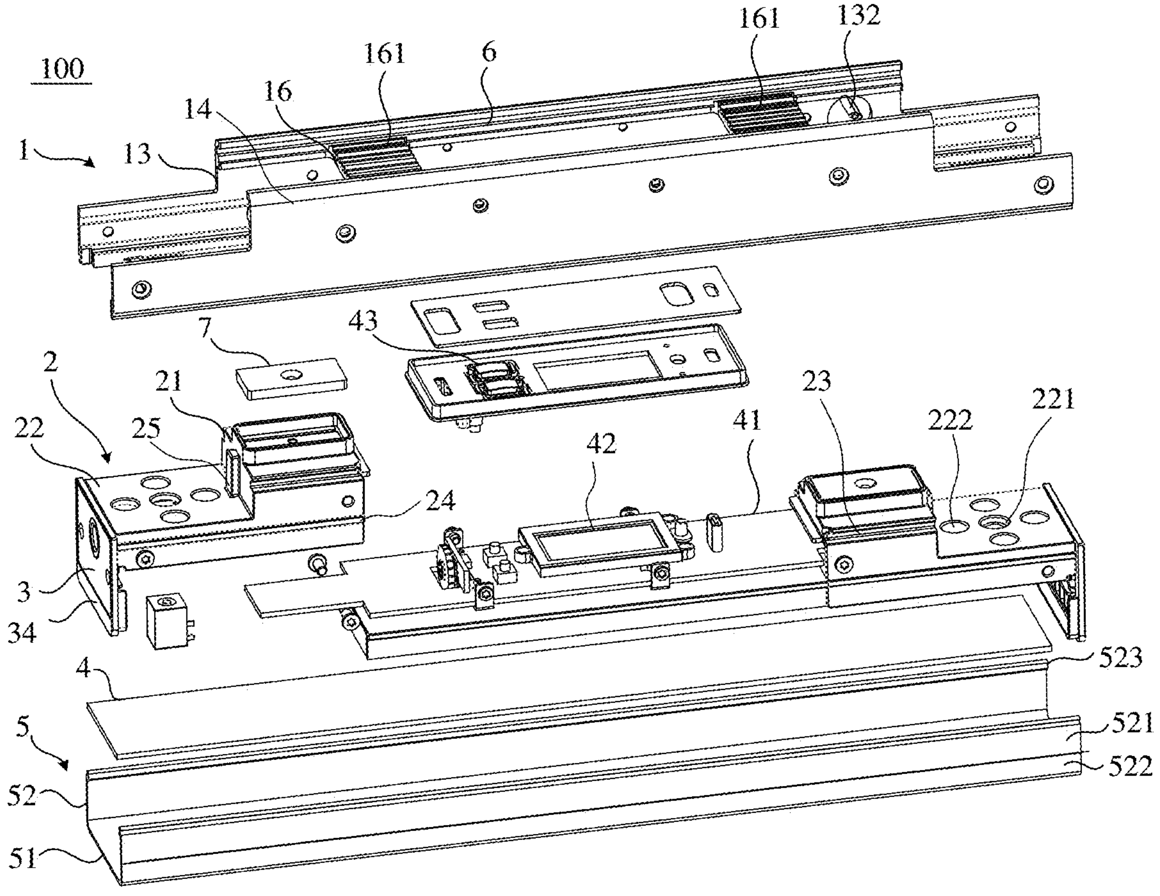
FIG. 2 is a structural diagram in an exploded view of the lighting apparatus provided in an embodiment of the present application.
Figure 3:
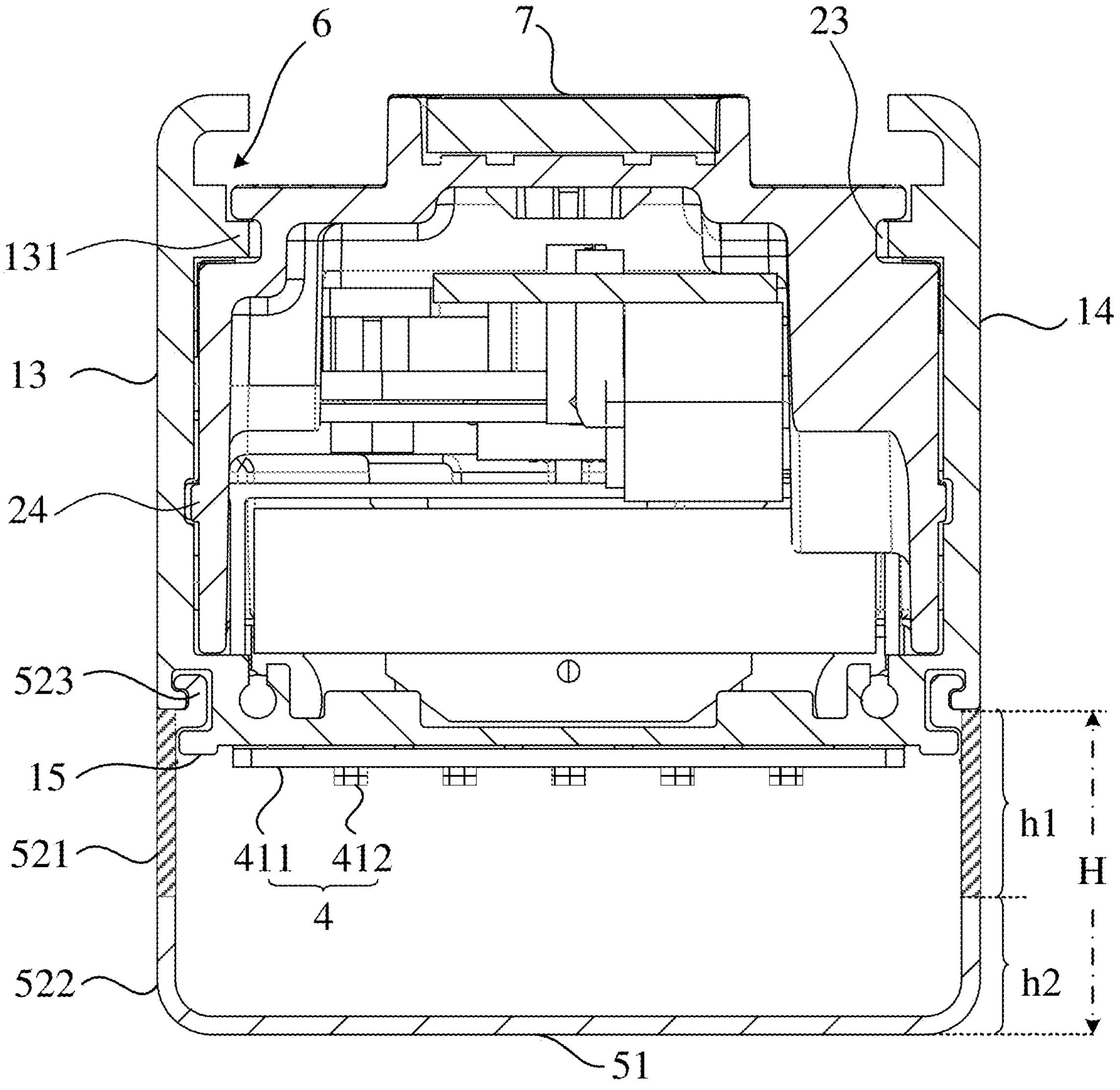
FIG. 3 is a cross-sectional structural diagram of FIG. 1 at P.
Figure 9:
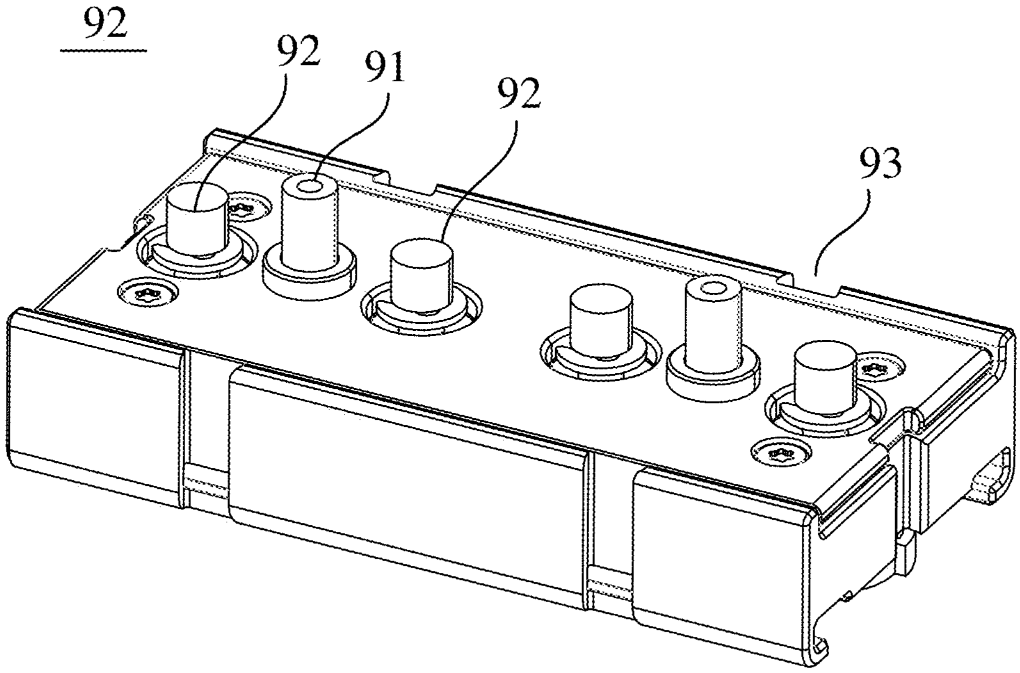
FIG. 9 is a structural diagram of the splicing piece provided in an embodiment of the present application.
Figure 10:
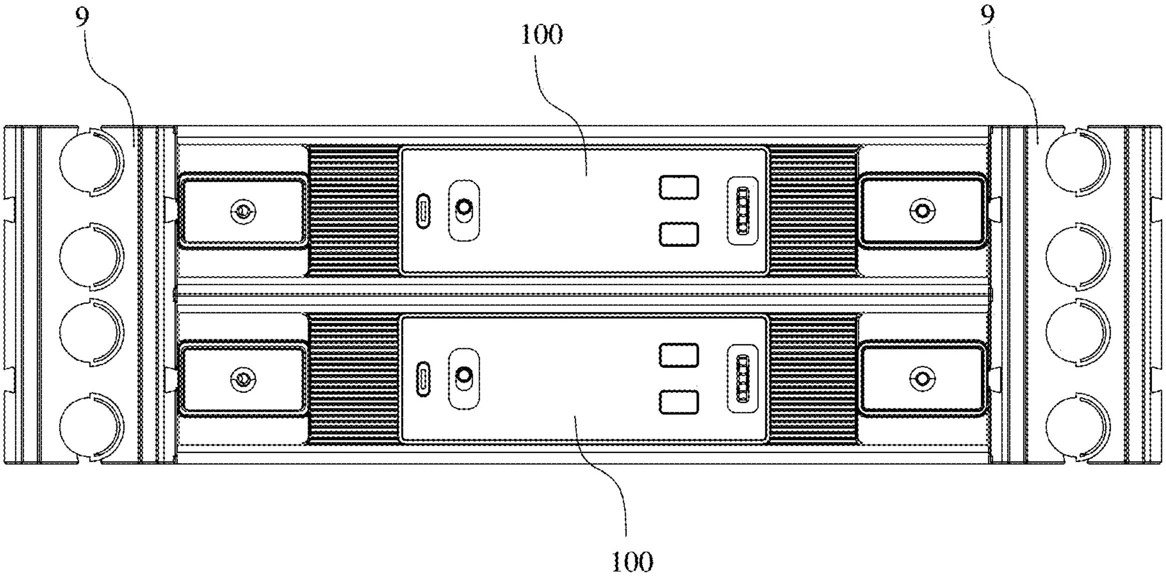
FIG. 10 is a structural diagram of the lighting system provided in an embodiment of the present application.

Referring to FIGS. 2, 9, and 10, provided in the present application is also a lighting system, including a splicing piece 9 and at least two lighting apparatuses 100 as mentioned above. The diffusion shields 5 and end covers 3 of two adjacent lighting apparatuses are aligned with each other. A mechanical terminal 92 of the splicing piece 9 is mechanically connected to a mechanical terminal 222 of a splicing surface 22 of the lighting apparatus. The electrical terminal B 91 of the splicing piece 9 is electrically connected to the electrical terminal A 221 of the splicing surface 22 of the lighting apparatus. A groove 93 provided on a periphery of the splicing piece 9 is snap-fitted with the guiding block 25 of the lighting apparatus. The symmetrical arrangement of the mechanical terminals 222 and the electrical terminals A 221 allows the splicing piece 9 to be spliced horizontally and vertically in any direction. Other features of the lighting apparatus are not further described herein, which are shown in detail in the embodiments mentioned above.

The technical means disclosed in the solution of the present application are not limited to those disclosed in the embodiments mentioned above but also include technical solutions consisting of any combination of the above technical features. It should be noted that for those skilled in the art, a plurality of improvements and modifications may be made without departing from the principles of the present application. These improvements and modifications are also considered to be within the scope of protection of the present application.

The invention claimed is:

1. A lighting apparatus, characterized by comprising:

a housing;

a light source module, provided in the housing;

a diffusion shield, connected to the housing and spaced apart from the light source module; and an end cover, provided on two ends of the housing and connected to the diffusion shield, wherein the diffusion shield comprises a first diffusion wall and a second diffusion wall positioned on two sides of the first diffusion wall, wherein the second diffusion wall further comprises a light shading area and a light transmitting area both in a light emitting direction X, the light transmitting area connected to the first diffusion wall, the light shading area positioned on a side of the light transmitting area distal to the first diffusion wall, light of the light source module emitting from the first diffusion wall and the light transmitting area;

the light shading area and the light transmitting area are parallel to an extending direction of the light source module; the light shading area is configured to allow reflection of light from the light source module, and along the light emitting direction X, a height h1 of the light shading area is greater than a height h2 of the light transmitting area, wherein the height of the light shading area satisfies that $H\times\frac{1}{2}\leq h1\leq H\times\frac{3}{4}$, H indicating a height of the second diffusion wall; and the first diffusion wall and the second diffusion wall are formed integrally;

the end cover is provided perpendicular to the diffusion shield substantially; along a height direction of the second diffusion shield, the end cover comprises an end-cover light transmitting area; the end-cover light transmitting area comprises a light emitting area out of a plane Y on which the light source module is positioned; and the end-cover light transmitting area is used to diffuse the light emitted from the light source module;

the lighting apparatus further comprises a splicing holder; the splicing holder is provided on two ends of the housing, provided with stepped height difference, used to connect with a splicing piece; the end cover is connected to the splicing holder; and the end cover abuts the diffusion shield to form an enclosed space with the diffusion shield and the housing to accommodate the light source module;

the splicing holder comprises a connecting surface connected to the housing and a splicing surface, wherein the splicing surface is connected to the end cover and a surface of the splicing surface is aligned with a lateral surface of the end cover; the connecting surface is positioned on a side of the splicing surface distal to the end cover; there is height difference between the connecting surface and the splicing surface; and the connecting surface is used for splicing with the splicing piece;

the lighting apparatus further comprises a circuit board, wherein the circuit board is positioned in the housing and electrically connected to the light source module; the splicing surface comprises an electrical terminal A and a mechanical terminal, wherein a number of the mechanical terminals is greater than that of the electrical terminals A; and the mechanical terminals are spaced apart around the electrical terminal A, the mechanical terminal used for mechanically connecting to a terminal of the splicing piece, the splicing piece configured to be fixed to the lighting apparatus and electrically connect another adjacent lighting apparatus, an end of the electrical terminal A electrically connected to the circuit board, an opposite end of the electrical terminal A relatively exposed for connecting with electrical terminal B on the splicing piece;

a side of the housing opposite to the diffusion shield is provided with a sliding groove, the sliding groove extending in a first direction: a top surface of the sliding groove is higher than the connecting surface; the sliding groove is used for snap-fitting with an external supporting plate; and a height of a bottom surface of the sliding groove is higher than that of a portion of both a display and buttons exposed relative to the housing;

the lighting apparatus also comprises two first magnetic bodies; each first magnetic body is fixed on top of the connecting surface adjacent to the splicing surface; the first magnetic body is parallel to the light source module; a surface of the first magnetic body is used to fix with an external structure;

a side of the connecting surface facing the splicing surface is further provided with a guiding block; the guiding block extends along a direction of the height difference between the connecting surface and the splicing surface; and the guiding block is used for snap-fitting with a groove of the splicing piece;

there are four mechanical terminals and one electrical terminal A, wherein the four mechanical terminals are provided equally spaced apart around the electrical terminal A as a center, and the guiding block as well as two of the mechanical terminals are provided coaxially;

the lighting apparatus further comprises a second magnetic body, wherein the second magnetic body comprises a magnetic main body and snap-fit edges positioned on two sides of the magnetic main body; the snap-fit edge is used for detachably snap-fitting with the sliding groove; and a side of the magnetic main body is correspondingly connected to the first magnetic body, while an opposite side of the magnetic main body is used for magnetic fixation with an external structure.

2. The lighting apparatus according to claim 1, characterized in that the housing comprises a first lateral plate, a bottom plate, a second lateral plate and a top plate sequentially enclosed; the first lateral plate and the second lateral plate are parallel, and each of the first lateral plate and the second lateral plate is provided with a mounting groove; the connecting surface and the splicing surface are connected to the first lateral plate and the second lateral plate; a height difference of the first lateral plate and the second lateral plate corresponding to positions of the connecting surface and the splicing surface is identical to that between the connecting surface and the splicing surface; the bottom plate is parallel to the top plate; end surfaces of the first lateral plate, the second lateral plate, the diffusion shield and the connecting surface abut the end cover; the light source module is provided on a side of the bottom plate opposite to the top plate; the circuit board is provided between the bottom plate and the top plate; any one of the first lateral plate and the second lateral plate is provided with an electrical socket; the electrical socket is electrically connected to the circuit board; a side of the top plate opposite to the bottom plate is provided with cooling fins extending along an arrangement direction of the light source module; and the cooling fins are lower than a top surface of the sliding groove.

3. The lighting apparatus according to claim 1, characterized in that the light shading area is provided with a reflective layer; a side of the light shading area distal to the light transmitting area is provided with a mounting track; a bottom of the housing is provided with a mounting groove; and the mounting track is snap-fitted with the mounting groove correspondingly, wherein the mounting groove comprises a top snap-fit edge, a bottom snap-fit edge, a first side snap-fit edge and a second side snap-fit edge, and the top snap-fit edge, the bottom snap-fit edge, the first side snap-fit edge and the second side snap-fit edge abut an upper side, a lower side, a left side and a right side of the mounting track respectively.

4. The lighting apparatus according to claim 1, characterized in that the end cover comprises an end cover body and a snap-fit rib, wherein the snap-fit rib is protruded from a side of the end cover body facing the diffusion shield and positioned at an edge of the end cover body; a bending direction of the snap-fit rib is provided in correspondence with an outer contour of a cross-section formed by the first diffusion wall and the second diffusion wall, so as to attach to the diffusion shield;

the end-cover light transmitting area is provided on the end cover body corresponding to an area enclosed by the first diffusion wall and the second diffusion wall, the end cover being made up of light-transmitting material;

a side of the end cover body opposite to the splicing holder is further provided with a mechanical insertion hole and a fixing hole, wherein the mechanical insertion hole is positioned between two adjacent fixing holes and used for connecting with a fixing bracket externally; and the fixing hole is connected to the housing to fix the end cover.

5. The lighting apparatus according to claim 1, characterized in that the end cover further comprises an end-cover light shading area, wherein the end-cover light transmitting area is aligned with the light transmitting area and the end-cover light shading area is aligned with the light shading area of the second diffusion wall.

6. A lighting system, characterized by comprising a splicing piece and at least two lighting apparatuses, wherein diffusion shields and end covers of two adjacent lighting apparatuses are aligned with each other, the lighting apparatus comprising:

a housing;

a light source module, provided in the housing;

a diffusion shield, connected to the housing and spaced apart from the light source module; and an end cover, provided on two ends of the housing and connected to the diffusion shield, wherein the diffusion shield comprises a first diffusion wall and a second diffusion wall positioned on two sides of the first diffusion wall, wherein the second diffusion wall further comprises a light shading area and a light transmitting area both in a light emitting direction X, the light transmitting area connected to the first diffusion wall, the light shading area positioned on a side of the light transmitting area distal to the first diffusion wall, light of the light source module emitting from the first diffusion wall and the light transmitting area;

the light shading area and the light transmitting area are parallel to an extending direction of the light source module; the light shading area is configured to allow reflection of light from the light source module, and along the light emitting direction X, a height h1 of the light shading area is greater than a height h2 of the light transmitting area, wherein the height of the light shading area satisfies that $H\times\frac{1}{2}\leq h1\leq H\times\frac{3}{4}$, H indicating a height of the second diffusion wall; and the first diffusion wall and the second diffusion wall are formed integrally;

the end cover is provided perpendicular to the diffusion shield substantially; along a height direction of the second diffusion shield, the end cover comprises an end-cover light transmitting area; the end-cover light transmitting area comprises a light emitting area out of a plane Y on which the light source module is positioned; and the end-cover light transmitting area is used to diffuse the light emitted from the light source module;

the lighting apparatus further comprises a splicing holder; the splicing holder is provided on two ends of the housing, provided with stepped height difference, used to connect with a splicing piece; the end cover is connected to the splicing holder; and the end cover abuts the diffusion shield to form an enclosed space with the diffusion shield and the housing to accommodate the light source module;

the splicing holder comprises a connecting surface connected to the housing and a splicing surface, wherein the splicing surface is connected to the end cover and a surface of the splicing surface is aligned with a lateral surface of the end cover: the connecting surface is positioned on a side of the splicing surface distal to the end cover; there is height difference between the connecting surface and the splicing surface; and the connecting surface is used for splicing with the splicing piece;

the lighting apparatus further comprises a circuit board, wherein the circuit board is positioned in the housing and electrically connected to the light source module; the splicing surface comprises an electrical terminal A and a mechanical terminal, wherein a number of the mechanical terminals is greater than that of the electrical terminals A; and the mechanical terminals are spaced apart around the electrical terminal A, the mechanical terminal used for mechanically connecting to a terminal of the splicing piece, the splicing piece configured to be fixed to the lighting apparatus and electrically connect another adjacent lighting apparatus, an end of the electrical terminal A electrically connected to the circuit board, an opposite end of the electrical terminal A relatively exposed for connecting with electrical terminal B on the splicing piece;

a side of the housing opposite to the diffusion shield is provided with a sliding groove, the sliding groove extending in a first direction; a top surface of the sliding groove is higher than the connecting surface; the sliding groove is used for snap-fitting with an external supporting plate; and a height of a bottom surface of the sliding groove is higher than that of a portion of both a display and buttons exposed relative to the housing;

the lighting apparatus also comprises two first magnetic bodies; each first magnetic body is fixed on top of the connecting surface adjacent to the splicing surface; the first magnetic body is parallel to the light source module; a surface of the first magnetic body is used to fix with an external structure;

a side of the connecting surface facing the splicing surface is further provided with a guiding block; the guiding block extends along a direction of the height difference between the connecting surface and the splicing surface; and the guiding block is used for snap-fitting with a groove of the splicing piece;

there are four mechanical terminals and one electrical terminal A, wherein the four mechanical terminals are provided equally spaced apart around the electrical terminal A as a center, and the guiding block as well as two of the mechanical terminals are provided coaxially;

the lighting apparatus further comprises a second magnetic body, wherein the second magnetic body comprises a magnetic main body and snap-fit edges positioned on two sides of the magnetic main body: the snap-fit edge is used for detachably snap-fitting with the sliding groove; and a side of the magnetic main body is correspondingly connected to the first magnetic body, while an opposite side of the magnetic main body is used for magnetic fixation with an external structure.

* * * * *